United States Patent [19]

Mauch

[11] 4,224,645
[45] Sep. 23, 1980

[54] METHOD AND APPARATUS FOR CONTROLLING THE MOVEMENT OF A RECORDING MEDIUM

[75] Inventor: Paul A. Mauch, Mountain View, Calif.

[73] Assignee: Ampex Corporation, Redwood City, Calif.

[21] Appl. No.: 874,739

[22] Filed: Feb. 3, 1978

[51] Int. Cl.² ............................................. G11B 15/46
[52] U.S. Cl. ..................................... 360/73; 360/10; 360/70
[58] Field of Search ..................... 360/73, 70, 71, 74, 360/10, 74.1; 318/314, 318, 685, 696

[56] References Cited

U.S. PATENT DOCUMENTS

| | | | |
|---|---|---|---|
| 3,639,688 | 2/1972 | Nelson | 360/73 |
| 3,699,247 | 10/1972 | Moshima | 360/10 |
| 3,900,890 | 8/1975 | Eibner | 360/73 |
| 3,913,134 | 10/1975 | Sargunar | 360/73 |
| 3,921,132 | 11/1975 | Baldwin | 360/33 |
| 3,931,639 | 1/1976 | Arter | 360/73 |
| 3,943,562 | 3/1976 | Opelt | 360/73 |
| 4,044,389 | 8/1977 | Oldershaw | 360/73 |

Primary Examiner—Stuart N. Hecker
Assistant Examiner—Alan Faber
Attorney, Agent, or Firm—Robert G. Clay; Ralph L. Mossino

[57] ABSTRACT

A recording medium transport control precisely controls the movement of a recording medium such as magnetic tape at a desired velocity. A pulse drive control adapted for manipulation provides drive pulses to the transport. Each drive pulse is of a variable duration sufficient to drive the transport so that the medium is moved a predetermined distance. One embodiment of the present invention includes a velocity servo drive control, also adapted for manipulation, for providing an adjustable continuous drive signal to the transport and a switch for switching control of the transport from the pulse drive control to the velocity servo drive control when the velocity of the transport reaches a predetermined cross-over velocity.

22 Claims, 7 Drawing Figures

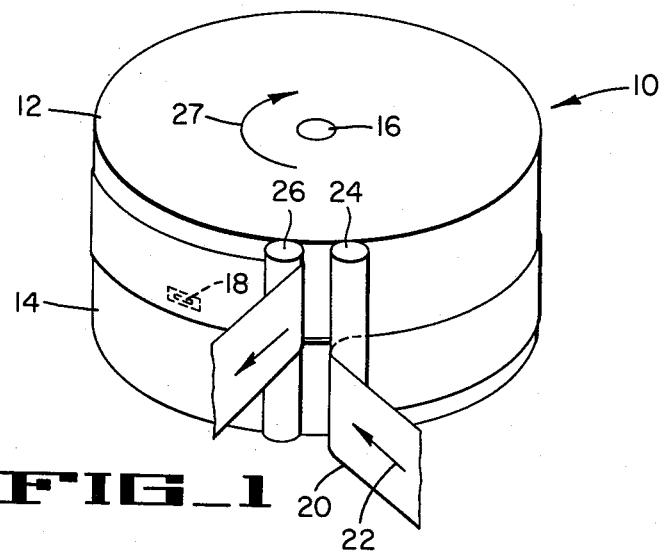
FIG_1
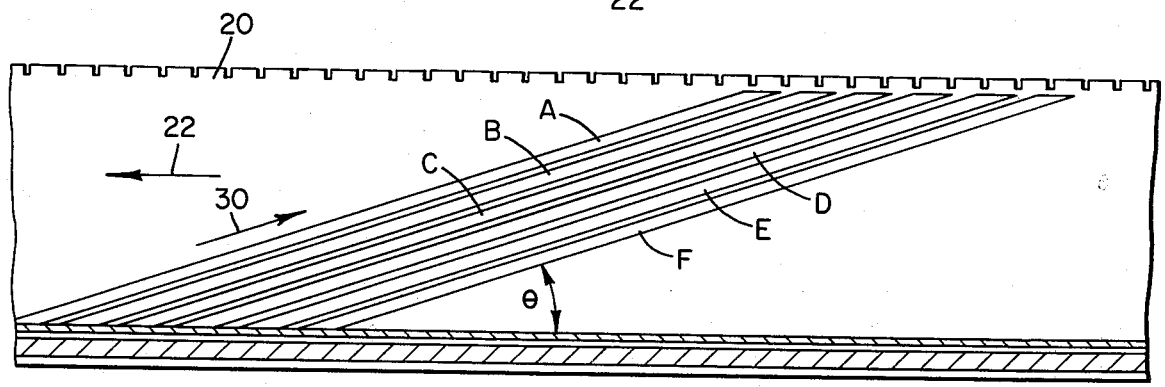
FIG_2
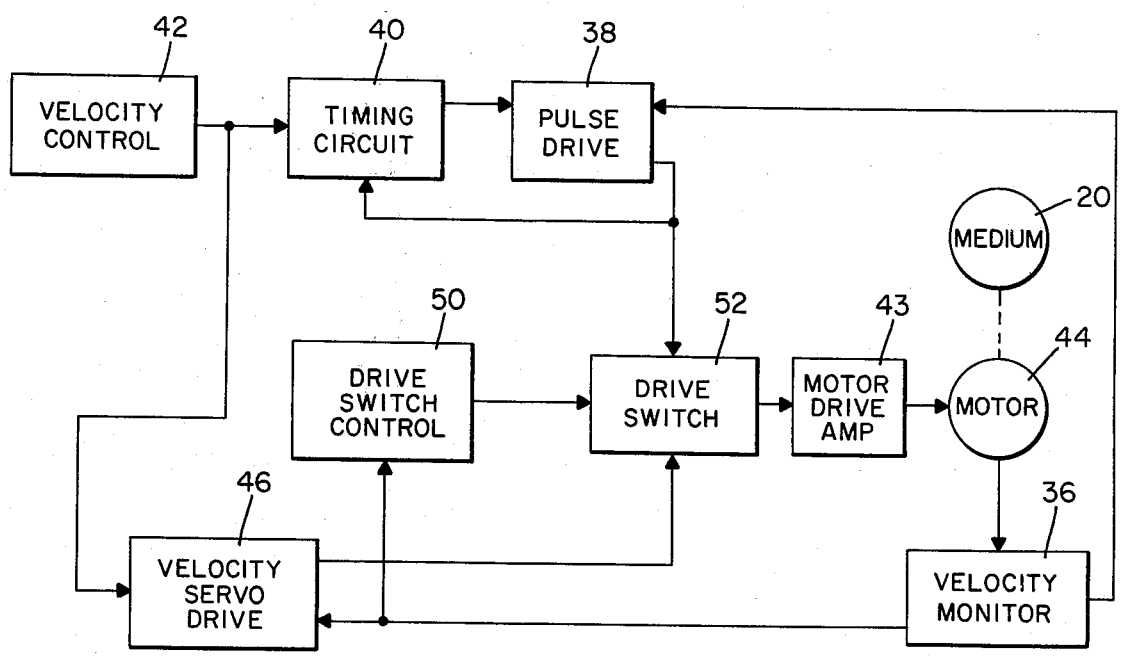
FIG_3A

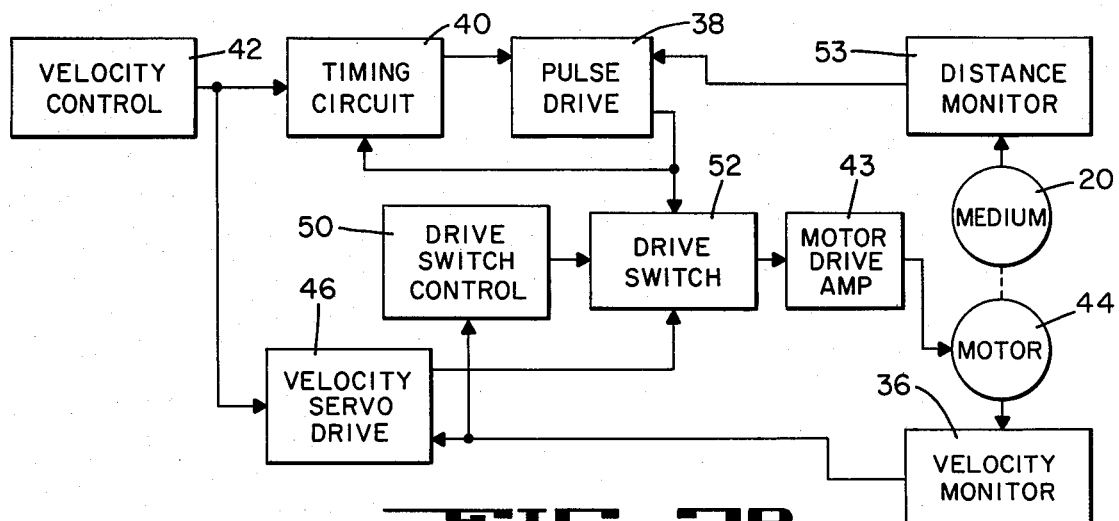
FIG_3B
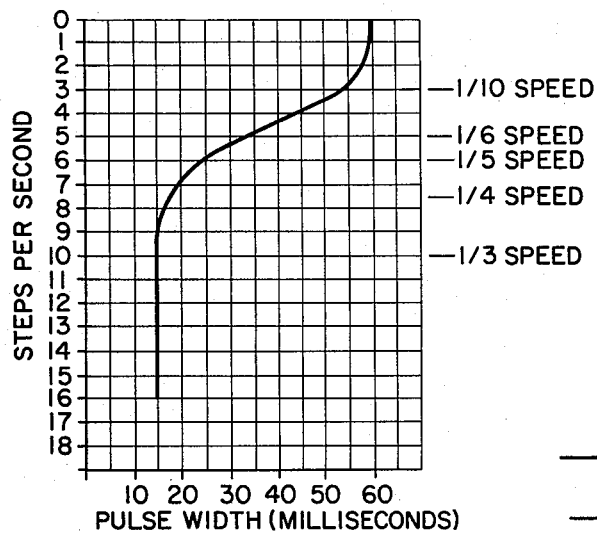
FIG_4
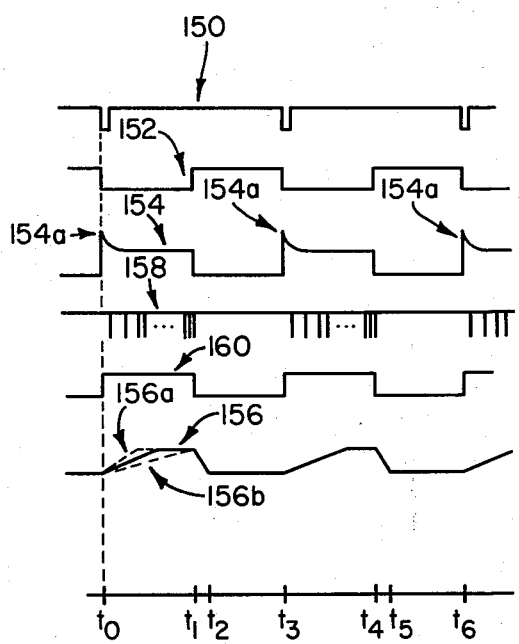
FIG_6

METHOD AND APPARATUS FOR CONTROLLING THE MOVEMENT OF A RECORDING MEDIUM

The present invention generally relates to recording and reproducing equipment, and more particularly to apparatus and method for controlling the physical movement of a recording medium used in such equipment at a desired velocity.

Recording and reproducing apparatus generally utilize a medium such as magnetic tape on which information is stored and from which information is reproduced. The apparatus is provided with a means for transporting or moving the medium relative to a scanning head and is commonly referred to as the transport. For a magnetic tape recording apparatus, the transport generally includes a pair of rotatable supports or turntables which receive the supply and take-up reels that carry the magnetic tape. A guide arrangement located between the supply and takeup reels guides the tape relative to a scanning assembly which performs the recording and reproducing operations. The transport also includes a capstan that is driven by a motor, for driving the tape at a predetermined speed or velocity relative to the scanning assembly. A velocity servo drive controls the velocity of the transport and in particular the velocity of the transport motor and capstan. The scanning assembly generally includes one or more transducing heads which operate to translate electrical signals to magnetic signals for storage on the tape during the recording operation, or which operate to translate magnetic signals stored on the tape into electrical signals during the reproducing operation. These magnetic signals are recorded on discrete parallel paths or tracks on the tape.

In a video tape recorder, the scanning assembly generally has a rotating scanning drum on which one or more transducing heads are mounted. The tape transport moves the tape relative to the scanning drum at a slight angle relative to the longitudinal direction of the tape for "helical wrap" recorders and essentially perpendicular to the longitudinal direction for quadruplex recorders. Thus, the magnetic signals or video information signals are recorded on tracks that are at a slight angle relative to the longitudinal direction of the tape for helical recorders and perpendicular for quadruplex recorders.

Helical video tape recorders have been designed to create altered motion effects. Slow motion, for example, necessarily requires a track, which typically contains one field of video information, to be repeated one or more times during playback so that the visual motion observed on a video monitor is slowed down. For example, for the visual motion to appear at about one tenth of normal speed, each track will be scanned about ten times. This requires that the tape transport move the tape relative to the scanning drum at a velocity that is one tenth that at which the video information was recorded.

Because of friction between the tape and the scanning drum, it has been very difficult to transport the tape with precisely controlled constant motion at low speeds using conventional velocity servo drives. This problem has been further compounded by inertia in the capstan and reels, as well as in the motor driving the capstan.

Existing arrangements for controlling the motion of the tape at low speeds have included pulse drive systems that supplied a drive pulse of a fixed length to the capstan motor. Each pulse supplied to the capstan motor had a length or duration that was chosen to be sufficient to move the stationary or at rest tape a specified distance so that the next adjacent track could be scanned by the scanning drum. However, it has been found that as the pulse rate increased to move the tape faster, the friction between the tape and the scanning drum decreased. Thus, since less force was needed to move the tape a distance corresponding to one track, the pulse was too long and caused the capstan motor to move the tape a distance corresponding to more than one track. Thus, the next adjacent track was often skipped and could not be scanned the proper number of times for a particular slow motion effect. As the pulse rate further increased, even more tracks would be skipped each time a pulse was supplied to the capstan motor.

Accordingly, it is an object of the present invention to provide an improved method and apparatus for controlling the motion of the medium in a recording and reproducing apparatus which does not experience the above mentioned disadvantages.

It is another object of the present invention to provide a method and apparatus for controlling the motion of the medium that compensates for varying friction at varying velocities of medium motion.

Other objects and advantages of the invention will become apparent upon reading the following detailed description, in conjunction with the attached drawings, of which:

FIG. 1 is a perspective view of one type of helical wrap scanning assembly, simplified for the sake of clarity;

FIG. 2 is an enlarged segment of the magnetic tape having tracks A through F recorded thereon;

FIGS. 3a and 3b are schematic block diagrams illustrating the electrical circuitry associated with alternate embodiments of the apparatus of the present invention;

FIG. 4 is a diagram illustrating medium speed versus drive pulse width;

Figure 5:
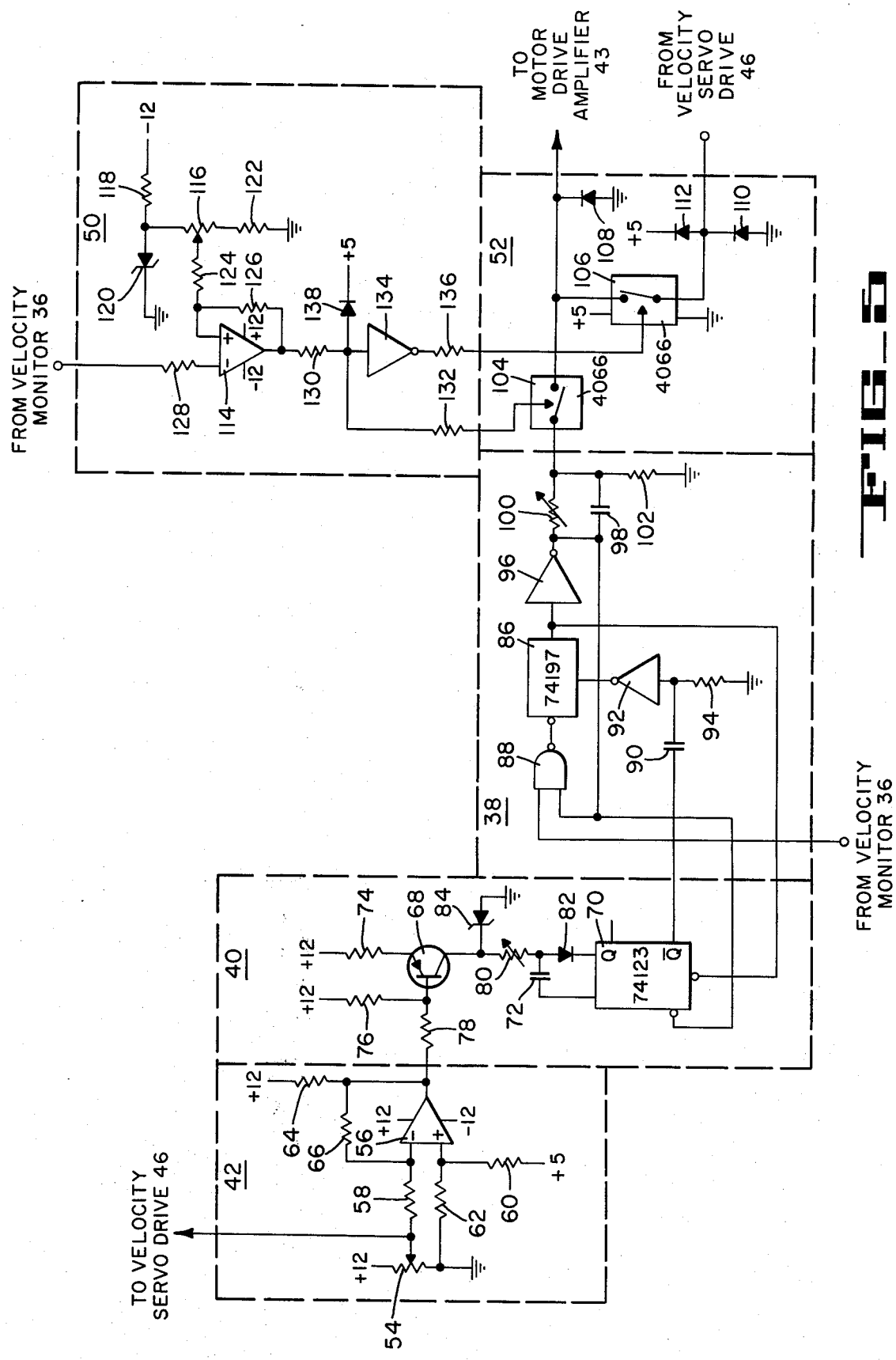
FIG. 5 represents an electrical schematic diagram of one form of circuitry that can be used to implement the apparatus of this invention; and, FIG. 6 is a timing diagram illustrating operation of the present invention.

Broadly stated, the invention is directed toward a method and apparatus for providing precise control of the transport of a recording medium. The apparatus of the present invention provides transport drive pulses, each of which defines a drive interval and causes the transport to move the medium a predetermined distance. Stated in other words, when the transport means is being driven by the pulse drive signals, each pulse is of a duration sufficient to move the medium a predetermined distance. Consequently, consecutive pulse drive signals will cause the transport to advance the medium a unit distance in a unit time, thereby producing an effective velocity of the recording medium corresponding to the pulse rate, i.e., the number of pulse drive signals per unit time. A zero recording medium effective velocity would correspond to zero pulses per unit time and would produce a still motion effect where a single track is repetitively scanned.

A preferred embodiment of the present invention generally provides a pulse drive control means adapted for operator manipulation for providing pulse drive signals at a rate substantially determined by said manipulation to drive a transport means for moving the medium. Each pulse drive signal is of a variable duration sufficient to drive the transport means so that the medium is moved a predetermined distance. Additionally, the embodiment can include a velocity servo control means, also adapted for manipulation, for providing an adjustable continuous transport means drive signal and switching means for switching control of the transport means from the pulse drive control means to the velocity servo control means when the transport means velocity reaches a predetermined cross-over velocity.

The pulse drive control means generally comprises monitoring means for monitoring the movement of the medium and providing signals in accordance with the distance that the medium moves, drive means responsive to the signals from the monitoring means for driving the transport means until the medium has moved a predetermined distance, and control means adapted for manipulation for controlling the drive means. The control means is adapted to selectively enable the drive means, at a rate substantially determined by the manipulation, to drive the transport means.

The present invention will now be described in connection with an apparatus utilizing magnetic tape as the medium on which the information is recorded and in particular a helical wrap tape recording and reproducing apparatus, although it is also applicable to other types of recording apparatus and other recording mediums.

Turning now to the drawings and particularly FIG. 1, there is shown a video head scanning drum for a helical wrap recorder, indicated generally at 10, which is shown to comprise a rotatable upper drum portion 12 and a stationary lower drum portion 14, the upper drum 12 being fixed to a shaft 16 which is driven by a motor (not shown) operatively connected thereto in a conventional manner. The scanning drum 10 has a transducing head 18 carried by the rotational drum portion 12 and is mounted on an elongated movable support element (not shown). The support element is preferably of the type that flexes or bends in a direction transversely of the recorded track during playback, with the amount and direction of movement being a function of electrical signals being applied thereto. An example of such a support element is more fully described in a co-pending application, Hathaway et al, Ser. No. 677,815, filed Apr. 16, 1976.

The illustrated scanning drum 10 is a part of a helical omega wrap video tape recorder which has a magnetic tape 20 advancing toward the drum in the direction of the arrow 22 as shown. More specifically, the tape is introduced to the drum surface from the lower right as shown in the drawing and is fed around a guide 24 which brings the tape into contact with the outer surface of the stationary lower portion 14 whereupon the tape travels almost completely around the drum until it passes around a second guide 26 which changes direction of the tape as it exits the scanning drum after either recording or reproducing has been performed. The upper portion 12 of the drum 10 rotates in the direction of the arrow 27.

With respect to the recording of the signals on the tape itself and referring to FIG. 2, a segment of the tape 20 is shown to have a number of recorded tracks A through F thereon, together with arrows 22 and 30 which respectively illustrate the direction of tape motion around the scanning drum 10 and the direction of head scan relative to the tape itself. The orientation of the tracks and the arrows shown in FIG. 2 coincides with that produced by the movement of the scanning drum 10 and the tape 20 shown by the arrows in FIG. 1. At a constant tape velocity and angular velocity of the upper scanning drum portion 12, tracks A through F will be substantially straight and parallel to one another at a small angle $\theta$ (of about 3°, for example) relative to the longitudinal or lengthwise direction of the tape, with each rightward track shown in the drawing being successively produced during the recording operation. Since track B, for example, would be recorded immediately after track A was recorded for given scanner rotation and tape velocities, it should also be appreciated that if these velocities are maintained during the reproducing or playback operation, the transducing head 18 would play back track B during a successive revolution immediately after having reproduced information from track A.

To achieve special motion and other effects during reproduction of the information signals that are recorded on a video tape or other elongated medium, it is necessary to vary or adjust the transport velocity of the tape around the scanning drum. To produce a speeded up or fast motion, effect, the transport velocity of the tape is increased relative to that which was used during recording. Similarly, to produce slow motion effects, it is necessary to reduce the velocity of the tape around the scanning drum relative to that which was used during the recording process. Stop motion requires that the tape be stopped so that the transducing head on the scanning drum can repetitively scan the information stored on a single track. The present invention can be used in conjunction with a transducing head capable of automatically following a track from beginning to completion and thereafter adjusting its position, if needed, to the beginning of the proper track, as disclosed in copending Hathaway et al application entitled "Method and Apparatus for Producing Special Motion Effects in Video Recording and Reproducing Apparatus", Ser. No. 677,815, filed Apr. 16, 1976, and assigned to the same assignee as the present invention.

As can be seen in FIG. 1, the tape 20 comes into physical proximity with the rotating means for rotating the transducing head or scanning drum 10 where the tape 20 is wrapped around scanning drum 10. The tape 20 does not necessarily touch the scanning drum 10 because the high rotational speed of the upper scanning drum portion 12 establishes a thin layer of air between the tape 20 and the surfaces of both the rotating upper and stationary lower scanning drum portions 12 and 14. The area of tape 20 that is in physical proximity with the scanning drum 10 (hereinafter often referred to as the area of proximity) determines the track or tracks that are capable of being scanned by the transducing head 18. Thus, by closely controlling the movement of the tape 20 relative to the scanning drum 10, the area of proximity can be controlled thereby allowing the desired track to be scanned.

As noted earlier, friction is produced within the area of proximity between tape 20 and the surface of the scanning drum 10. This friction results in the tape 20 resisting movement relative to the scanning drum 10. The amount of friction varies greatly with the effective velocity of the tape thus making it very difficult to precisely control the speed or velocity at which the tape is being transported especially at relatively low velocities, i.e., those velocities less than about $\frac{1}{8}$ of normal recording and reproducing velocity. In addition, inertia inherent within the motor, capstan, reels and tape further contribute to the difficulties encountered in precisely controlling the tape velocity.

One embodiment of the pulse drive control means includes monitoring means for monitoring the movement of the medium 20 and providing signals in accordance with the distance that the medium moves. The embodiment of FIG. 3a includes a velocity servo control monitor 36 for controlling the medium transport velocity at speeds where inertia and friction do not interfere with precise transport control. Hence, a velocity monitor 36 such as a tachometer is employed to provide the distance related signals because tachometers conveniently provide both distance and velocity related information, the velocity information being required by the velocity servo control. The pulse drive control means further includes drive means, responsive to tachometer pulse signals from the monitoring means for driving a transport means until the medium has moved a predetermined distance, which is shown to be a pulse drive 38, and control means adapted for manipulation for controlling the drive means which is shown as a timing circuit 40 and a velocity control 42. The velocity control 42 is manipulated to selectively enable the drive means to drive the transport means which includes a motor 44 for moving the medium 20, which motor may for example comprise the capstan motor of the apparatus.

In this embodiment of the invention, a velocity servo control means is also provided that is adapted for manipulation and shown here as the velocity control 42, and a velocity servo drive 46 responsive to signals from both the velocity control and the velocity monitor 36, for providing an adjustable continuous signal to drive the transport means. In addition, there is provided a drive switch control 50 also responsive to the signals from the velocity monitor, and a drive switch 52, for switching control of the transport means from the pulse drive control means to the velocity servo control means. The velocity monitor output coupled to the pulse drive 38 comprises tachometer pulses occurring at a rate proportional to the speed of the motor and the velocity monitor output coupled to the velocity servo drive 46 and the drive switch control 50 comprises a voltage having a magnitude proportional to the speed of the motor. The voltage output of the velocity monitor 36 is derived in a conventional manner by coupling the tachometer pulses through a sample and hold circuit. In this embodiment, the drive switch control 50 switches control of the transport means to the velocity servo drive when the velocity of the motor 44 reaches a relatively low velocity, such as 1/5 speed, for example.

The velocity servo control means operates in a conventional manner while it is in control of the motor 44, i.e., the rotational velocity of motor 44 is monitored by means of the velocity monitor 36 which feeds back this information to the velocity servo drive 46. The desired motor velocity, which corresponds to a desired tape velocity, is fed into the velocity servo drive 46 by means of the velocity control 42. The velocity servo drive 46 compares the desired velocity signal from velocity control 42 with the actual velocity signal being fed back from the velocity monitor 36 and provides a drive signal to the motor 44 by means of the switch 52 and the motor drive amplifier 43 to correct the velocity of the motor 44 to the desired velocity in a known manner.

When the tape transport is operating at relatively low speeds, the pulse drive control means controls the motor 44, i.e., the pulse drive 38 provides a pulse to motor 44 through the drive switch 52 and the motor drive amplifier 43 to drive the motor 44 for a drive interval defined by the width of the drive pulse. The pulse drive 38 includes a counter that counts a predetermined number of pulses from the velocity monitor 35, which number of pulses is proportional to the distance that the medium is moved by the motor 44. The pulse drive 38 then terminates the drive pulse to end the drive interval when the tape has moved a predetermined distance in accordance with the number of pulses received from the velocity monitor 36. Thus, the transport has moved the tape so that a new track may be scanned.

The pulse drive 38 then triggers the timing circuit 40 to begin timing another timed interval, the duration of which is determined by the velocity control 42. The duration of the timed interval substantially determines the number of times the new track is scanned and determines the visual motion effect as explained above. At the end of that timed interval, the timing circuit 40 resets the pulse drive 38, which then begins driving the motor 44 again for the predetermined distance which allows another track to be scanned. Since the velocity control 42 determines the timed interval between the drive pulses produced by the drive pulse 38, the velocity control 42 and the timing circuit 40 substantially control the rate at which the pulse drive 38 produces the drive pulses.

The medium transport does not stop immediately at the end of a motor drive pulse but instead rapidly coasts to a stop. The transport can be made to stop reasonably rapidly by the use of a servo or a differential motor drive amplifier, both of which are well known. However, such circuitry was not needed in one construction of this embodiment because the transport that was employed, namely, an Ampex VPR-1 video tape recorder as manufactured by the assignee hereof coasted to a stop in approximately the same distance following each motor drive pulse. As the velocity control 42 is increased, the drive pulse rate increases so that drive pulses begin arriving before the transport coasts to a stop. At a certain drive pulse rate, the pulses arrive at a rate sufficient to drive the motor 44 at a relatively constant velocity. At this velocity of the motor 44, the effective velocity of the transport is such that the friction has become significantly reduced. With reduced friction between the tape and the scanning drum and guides, the velocity of the tape can be effectively controlled by controlling the velocity of the motor by means of the velocity servo control means. Thus, a "cross-over" velocity of the motor 44 can be defined at which the velocity servo control means can adequately control the velocity of the tape allowing control of the motor 44 to be switched from the pulse drive control means to the velocity servo control means, which will be explained further hereinbelow.

The drive switch control 50 monitors the velocity of the motor 44 by comparing the amplitude of the voltage from the velocity monitor 36 with a reference voltage representative of this preselected cross-over velocity. The control 50 causes the drive switch 52 to switch control of the motor 44 to the velocity servo drive control means when the cross-over velocity has been reached.

An alternate form of this invention is shown in the block diagram of FIG. 3b wherein like reference numerals are used to identify like components. A distance monitor 53 is shown coupled between the medium 20 and the pulse drive 38, which distance monitor functions to measure the actual distance traveled by the medium. Besides a tachometer the distance monitor 53 may comprise, for example, a footage counter of the transport mechanism (not shown). Also, the distance monitor 53 may comprise a control track on the medium itself in combination with a magnetic pickup means disposed in proximity to the control track. This latter alternative for the distance monitor is not preferred, however, since relative motion between the medium and the magnetic pickup is required to read the control track.

The operation of the apparatus of the embodiment in FIG. 3b is essentially the same as that shown in FIG. 3a with the exception that the counter within the pulse drive 38 now counts output pulses from the distance monitor 53. The predetermined count in the pulse drive counter may be different in this embodiment since the pulses from the velocity monitor 36 (or tachometer) may not necessarily occur at the same time as the pulses from the distance monitor.

With reference to FIG. 4, a plot of medium speed versus drive pulse width is shown. For very slow speeds in the range of 1 to 2 steps per second the pulse width is 60 milliseconds. A "step" refers to an incremental distance of medium travel, which in one embodiment comprises two tracks of recorded information. Within the range of 3 to 9 steps per second, the pulse width decreases from 60 milliseconds to 15 milliseconds at which point the aforementioned "cross-over" velocity is reached. The aforementioned cross-over velocity occurs within the range of 1/6 speed to ⅓ speed. The relationship between pulse width and tachomter (or distance monitor) pulse counts will be more fully appreciated following the description accompanying FIGS. 5 and 6 below.

A specific construction of the pulse drive control means and the switching means will now be described with reference to FIG. 5. The velocity control 42 is adapted for manipulation so that a human operator may select a signal level proportional to a desired effective tape velocity. The velocity control 42 is shown to generally comprise a potentiometer 54 and an operational amplifier 56 wherein the two ends of the potentiometer 54 are connected between a plus twelve volt source and ground. The moveable tap of the potentiometer 54 is connected to the negative input of the amplifier 56 by means of a current limiting resistor 58, and is also coupled to the velocity servo drive 46 (FIGS. 3a and 3b). The potentiometer 54 provides a selectably variable voltage level to the amplifier 56 which controls the voltage swing of the amplifier. A pair of resistors 60 and 62 form a voltage divider between a plus five volt source and ground wherein the junction of the voltage divider is connected to the positive input of the amplifier 56 and provides a voltage reference. The output of the amplifier 56 is connected to a plus twelve voltage source by means of a pull-up resistor 64 and is also returned to the negative input of the amplifier 56 by means of a gain control resistor 66.

The signal provided by the velocity control 42 determines the duration of the timed interval of a timing circuit 40. It is noted that other forms of timing may be employed for the velocity control 42. The timing circuit 40 is shown comprising a current source transistor 68, which supplies current to a timing capacitor 72. The timing circuit 40 further comprises a one-shot multivibrator integrated circuit 70 which resets the pulse drive 38 when the voltage across the timing capacitor 72 reaches a predetermined level.

The one-shot 70 is shown in FIG. 5 with its common industry designation number, and the circuit diagrams for the actual construction are incorporated by reference. Other circuit elements such as the comparators, logic gates, inverters, etc., are well known in the art and are represented by their standard schematic symbol.

The emitter of the current source transistor 68 is connected to a plus twelve voltage source by means of a current limiting resistor 74. A pair of resistors 76 and 78 form a voltage divider between the plus twelve voltage source and the output of amplifier 56 and the junction of the voltage divider is connected to the base of the transistor 68. The resistor 76 pulls the base of the transistor 68 to the supply voltage.

The collector of current source transistor 68 is connected to the one-shot 70 by means of a calibration potentiometer 80 and the timing capacitor 72. The junction of the potentiometer 80 and the timing capacitor 72 is also connected to the one-shot 70 by means of a protection diode 82. The collector of the current source transistor 68 is also connected to ground by means of a voltage limiting zener diode 84.

The timing circuit 40 resets the pulse drive 38 after the timed interval is completed. The pulse drive 38 upon being reset, provides a drive pulse to the motor 44 (FIGS. 3a and 3b) of sufficient duration such that the motor 44 causes the tape to move a predetermined distance.

The pulse drive 38 is shown comprising a counter 86 for counting pulses from a motor tachometer (not shown), or other suitable means for measuring tape movement, and a NAND gate 88 connected to the clock input of the counter 86. The not true ($\overline{Q}$) output of the one-shot 70 is connected to the reset terminal of the counter 86 by means of a differentiating capacitor 90 and an inverter 92. The junction of the differentiating capacitor 90 and the inverter 92 is connected to ground by means of a resistor 94.

The velocity monitor 36 (FIGS. 3a and 3b) typically comprises the capstan motor tachometer which provides an output pulse after the tape has moved an incremental distance, and a predetermined number of pulses correspond to the aforementioned predetermined distance. The output of the velocity monitor 36 (FIG. 3a) is connected to a first input terminal of the NAND gate 88 whose output is connected to the clock input terminal of the counter 86. Alternatively, the output of the distance monitor 53 (FIG. 3b) is coupled to the first input of the NAND gate 88. While the counter 86 is counting the tachometer pulses from the velocity monitor, the counter 86 is causing a drive signal to be applied to the motor drive amplifier 43 through the drive switch 52 by means of an inverter 96 and a peaking capacitor 98.

The output of the inverter 96 is returned to the second input of the NAND gate 88 to enable the counter 86 to count the pulses from the motor tachometer.

The counter 86 continues to provide a drive signal until a preset number of pulses have been counted from the capstan motor tachometer. When the preset number of pulses have been counted (i.e., the tape has moved the predetermined distance), the output of the counter 86 changes state which terminates the drive signal applied to the motor. This change in state at the output of the counter also acts as a trigger signal to the one-shot 70 so that the one-shot 70 may begin timing another timed interval. Thus, the output of the inverter 96 is returned to the trigger terminal of the one-shot 70 to provide this trigger signal. The output of the inverter 96 also changes state to disable the NAND gate 88 and to prevent further tachometer pulses from reaching the counter 86 until the counter is again reset by the one-shot 70.

A calibration potentiometer 100 and a resistor 102 form a voltage divider between the output of inverter 96 and ground. The calibration potentiometer 100 is connected in parallel with peaking capacitor 98 to provide another path for the drive signal to the drive switch 52 after the peaking capacitor has charged up.

The drive switch 52, which switches between the pulse drive 38 and the velocity servo drive 46, is shown comprising semi-conductor switches 104 and 106. The output of pulse drive 38 provided through the potentiometer 100 or the capacitor 98 is connected to the input of the switch 104 whose output is connected to the motor driver amplifier 43 (FIGS. 3a and 3b).

The drive signal from the velocity servo drive 46 is provided at the input of the switch 106 whose output is also connected to the motor driver amplifier 43. The switches 104 and 106 are connected to a plus five volt supply, and switch 106 is also coupled to ground. The output of the switch 104 is connected to ground by means of a protection diode 108. The gate terminal of the switch 106 is connected to ground by means of a protection diode 110 and is also connected to a plus five voltage source by means of a protection diode 112.

Drive switch control 50 determines whether the drive signal from the pulse drive 38 or the drive signal from the velocity servo drive 46 will drive the motor 44 (FIGS. 3a and 3b). The drive switch control 50 is shown in FIG. 5 comprising a comparator 114 and a potentiometer 116. The comparator 114 compares the voltage level signal from the velocity monitor 36 with a predetermined reference voltage level from the potentiometer 116.

One end of the potentiometer 116 is connected to a negative 12 volt supply by means of a current limiting resistor 118 and is also connected to ground by means of a voltage reference zener diode 120. The other end of the potentiometer 116 is connected to ground by means of a limiting resistor 122. The movable tap of the potentiometer 116 is connected to the positive input terminal of the comparator 114 by means of a current limiting resistor 124. The positive terminal of comparator 114 is also connected to the output of the comparator 114 by means of a resistor 126. The negative input of the comparator 114 is connected to the voltage level output of the velocity monitor 36 by means of a current limiting resistor 128.

The output of the comparator 114 is connected to the gate terminal of the switch 104 by means of a current limiting resistor 130 and a coupling resistor 132. The junction between the resistors 130 and 132 is connected to the input terminal of an inverter 134 and to a plus five voltage source by means of a clamping diode 138. The output terminal of the inverter 134 is coupled to the gate terminal of the switch 106 through a resistor 136.

In operation, the velocity monitor 36 produces a continuous voltage signal which is proportional to the rotational velocity of the motor 44. The potentiometer 116 of the drive switch control 50 is preset to produce a voltage level signal corresponding to a predetermined motor velocity. The comparator 114 compares the signal from the velocity monitor 36 with the signal from the potentiometer 116 corresponding to the predetermined motor velocity. It is at this predetermined motor velocity or cross-over velocity, that drive switch 52 will switch control of the motor from pulse drive 38 to velocity servo drive 46.

To begin operation of the tape transport, the potentiometer 54 of the velocity control 42 is manually manipulated to produce a voltage which corresponds to a desired tape velocity. From an effective tape velocity of zero to the tape velocity that corresponds with the preset motor velocity of the potentiometer 116 of the drive switch control 50, the pulse drive 38 supplies the drive signals which drive the motor 44. Thus, at the relatively low motor velocities, the signal from the velocity monitor 36 is less than the signal from the potentiometer 116 causing the comparator 114 to provide a logical 1 output signal. The logical 1 signal level is transmitted to the switch 104 allowing it to be conductive. Thus, the drive signals from the pulse drive 38 are allowed to be transmitted to the motor 44 via the motor drive amplifier 43 (FIGS. 3a and 3b). The inverter 134 therefore provides a logical 0 output signal to the switch 106 rendering it non-conductive. Therefore, the drive signals from the velocity servo drive 46 are not transmitted to the motor.

A voltage supplied by the potentiometer 54 to the amplifier 56 causes transistor 68 to turn on. The higher the voltage, the more current the transistor 68 supplies. The amplifier 56 controls the voltage swing at its output to the base of the transistor 68 as the potentiometer 54 is manipulated. Thus, the current source transistor 68 of the timing circuit 40 supplies current to the timing capacitor 72 at a rate determined by the potentiometer 54. When the voltage across the capacitor 72 reaches a predetermined proportion of the supply voltage to the one-shot 70, the one-shot 70 provides a reset output signal which is differentiated by the capacitor 90 and inverted by the inverter 92 which resets the counter 86. Thus, after the interval timed by the timing circuit 70, which was determined by the potentiometer 54, the counter 86 is enabled and is ready to drive the motor and begin counting the pulses from the motor tachometer again.

When the counter 86 is reset, it provides a logical 0 output signal which is inverted by the inverter 96 and is the motor drive signal. The peaking capacitor 98 shapes the output from the inverter 96 to provide a "breakaway" pulse portion at the beginning of the motor drive signal in case there are any problems due to the tape sticking or due to other components of the tape transport sticking. (See FIG. 6 at waveform portion 154a to be described hereinafter.) The potentiometer 100 is adjusted initially to provide the desired drive signal level after the breakaway portion of the drive signal.

Since the switch 104 is in the conducting state, the drive signal from the counter 86 is propagated to the motor drive amplifier 43. As previously noted, the motor tachometer provides a pulse to counter 86 at each incremental movement of the tape while the tape is being moved by the motor. The counter 86 has been preset to change its output when a count of sixteen has been reached. In other words, the counter 86 ceases to provide a pulse drive signal when a count of sixteen has been reached. The count of sixteen corresponds to a movement by the tape of the predetermined distance. Thus, when the tape is moved the predetermined distance, counter 86 clocks out and the output changes from a logical 0 to a logical 1 and the output at inverter 96 changes from a logical 1 to a logical 0 which removes the drive signal from the motor 44.

Since the output of the inverter 96 is returned to the trigger input of the one-shot 70, the one-shot 70 triggers when the output of inverter 96 changes from a logical 1 to a logical 0. Thus, the one-shot now begins timing a new timed interval determined by potentiometer 54 and starts a new cycle.

As the velocity signal level of the potentiometer 54 increases, the output level of the amplifier 56 decreases and approaches zero. As the output of the amplifier 56 approaches zero, the rate at which the current source transistor 68 supplies current increases. This causes the capacitor 72 to reach the predetermined proportion of the supply voltage faster, thus causing the duration of the timed interval to become increasingly small. As the timed intervals become shorter, the one-shot 70 resets the counter 86 at a faster rate, enabling the counter 86 to provide drive pulses at a faster rate. Thus, the rate at which the timing circuit resets the counter is substantially determined by the potentiometer 54. In other words, the potentiometer 54 substantially determines the rate at which the pulse drive 38 is enabled.

During each drive pulse the motor causes the tape to move one-half the predetermined distance and the medium transport coasts the remaining one-half of the predetermined distance. The predetermined distance may be adjusted to any set distance, and in this embodiment has been set to correspond to approximately the lengthwise distance between adjacent tracks. Thus, after the tape has moved half the distance to the next track the pulse drive signal is removed and the medium transport coasts so as to move the tape the remaining distance to the next adjacent track. Accordingly, the tape is moved the distance between two tracks for a single pulse. In the embodiment, the drive interval lasts approximately 60 milliseconds at the lowest tape velocity and decreases to about 15 milliseconds at the cross-over velocity (FIG. 4), since it takes less power to move the tape the predetermined distance during each drive interval. This decreased power requirement is due generally to the friction decreasing as the effective velocity of the tape increases.

As noted earlier, a voltage proportional to the velocity of the motor 44 is provided by the velocity monitor 36 at the negative input of the comparator 114 of the drive switch control 50. As the velocity of the motor 44 approaches the cross-over velocity as preset by the potentiometer 116, the output of the comparator 114 goes negative (logical 0). This output causes the switch 104 to open and is no longer in the conducting state. The negative output of the comparator 114 is inverted by the inverter 134 producing a positive output (logical 1) which closes the switch 106 allowing the drive signals from the velocity servo drive 46 to be conducted to the motor drive amplifier 43. The drive switch 52 switches back and forth between the pulse drive 38 and the velocity servo drive 46 at the point of transition (the cross-over velocity) to provide a smooth transition from the low speeds to the high speeds and vice versa.

It should be noted that although the timing circuit 40 triggers and begins timing immediately after the end of the drive pulse in the illustrated embodiment, the timing circuit may be designed to trigger at any desired time within the drive interval. In any case, the rate at which the pulse drive is enabled will still be substantially determined by the velocity control.

The above-described operation is summarized by reference to the timing diagram of FIG. 6 and the description below. Waveform 150 illustrates the counter clear signal appearing at the output of the inverter 92 (FIG. 5). Waveform 152 illustrates the signal appearing at the output of the counter 86, and waveform 154 illustrates the output of the inverter 96. Amplitude peak portions 154a of the waveform 154 are caused by the peaking capacitor 98 and provide the initial increased drive or "breakaway" to overcome the aforedescribed stiction. It is waveform 154 that is supplied to the motor drive amplifier 43 to drive the motor 44.

Waveform 156 represents acceleration of the motor 44 in response to the amplified drive signal. The beginning slope may vary (as indicated by dashed line portions 156a and 156b) as a function of friction. It was found from experimentation that the deceleration of a given medium transport apparatus will not vary measureably. Accordingly, the trailing edges of the waveform 156 for the deceleration intervals are illustrated with a uniform slope.

Once the motor begins to move, pulses (waveform 158) are produced by either the tachometer (FIG. 3a) or distance monitor (FIG. 3b). The counter 86 counts a predetermined number of these pulses whereupon the output of the counter (waveform 152) changes from a low to a high state at times $t_1$ and $t_4$. The drive to the motor similarly changes from a high to a low state at the same time (waveform 154). However, the motor does not stop immediately, but coasts for a short period of time (i.e., times $t_1$ to $t_2$ and $t_4$ to $t_5$) before stopping. Even though additional pulses may be produced by the tachometer or distance monitor during the coasting period, these additional pulses will not be received by the counter since the NAND gate 88 is disabled by the changed state of the counter output.

Waveform 160 represents the not true ($\overline{Q}$) output of the one-shot 70. At times $t_1$ and $t_4$ the one-shot 70 is reset so as to begin the time delay period. Thus, the time period between times $t_1$ and $t_3$, and between times $t_4$ and $t_6$ is determined by the one-shot 70 which in turn is determined by the setting of the potentiometer 54.

The counter will always count the same number of pulses for each drive pulse cycle and the pulse width will vary as a function of speed (FIG. 4). The time period between pulses is a variable that determines the speed of operation since this time period determines the frequency at which the drive pulses are produced.

It will, of course, be understood that modifications of the present invention, and its various aspects will be apparent to those skilled in the art, some being apparent only after study, and others being matters of routine electronic design. Accordingly, the scope of the invention should not be limited by the particular embodiment and specific construction herein described, but should be defined only by the appended claims, and equivalents thereof.

Various features of the invention are set forth in the following claims.

What is claimed is:

1. A method for closely controlling the movement of a medium moved by transport means comprising the steps of:

starting the driving of the transport means for a drive interval that will move said medium a predetermined distance, said drive interval being of variable time duration depending upon the speed at which said medium is moved the predetermined distance;

monitoring movement of the medium to determine if said medium has moved said predetermined distance;

controlling the length of said time duration of the drive interval so that the medium moves said predetermined distance; and, controlling the frequency of said drive intervals to a desired frequency of medium movements of said predetermined distances in accordance with said desired velocity by adjusting the time between drive intervals.

2. The method as defined in claim 1 wherein the apparatus further has a velocity servo control means for providing an adjustable continuous signal to control the velocity of the transported medium, the method further comprising the steps of:

monitoring the velocity of the transported medium; and, switching control of the transport means to the velocity servo control means when the transported medium reaches and exceeds a predetermined velocity.

3. The method as defined in claim 1 wherein information is recorded on a plurality of generally parallel tracks located adjacent one another on an elongated medium and said predetermined distance is substantially equal to the lengthwise distance along the elongated medium from the center of a track to the center of an adjacent track.

4. The method as defined in claim 1 wherein information is recorded on a plurality of generally parallel tracks located adjacent one another on an elongated medium and said predetermined distance is substantialy equal to ½ the lengthwise distance along the elongated medium from the center of a track to the center of an adjacent track.

5. A method for closely controlling the velocity of movement of an elongated medium that comes into physical proximity with surfaces having friction and/or other forces that can impede movement of said medium, said method being adapted for use in apparatus having transport means for moving the elongated medium and velocity servo control means for providing an adjustable continuous signal to control the velocity of the transported medium after the medium reaches and exceeds a predetermined velocity and comprising the steps of:

starting the driving of the transport means for a drive interval that will move said medium a predetermined distance equal to one-half the lengthwise distance along the elongated medium that said medium is to be moved during said drive interval said drive interval being of variable time duration depending on the presence and amount of impeding forces;

monitoring movement of the medium to determine if said medium has moved said predetermined distance;

controlling the length of said time duration of the drive interval so that the medium moves said predetermined distance;

controlling the frequency of said drive intervals to a desired frequency of medium movements of said predetermined distances in accordance with the desired velocity of movement of said medium;

monitoring the velocity of the transported medium; and, switching control of the transport means to the velocity servo control means when the transported medium reaches and exceeds a predetermined velocity.

6. The method as defined in claim 5 further comprising the step of switching control of the transport means from the velocity servo control means when the velocity of the transported medium falls below the predetermined velocity.

7. The method as defined in claim 6 wherein said medium has signal information recorded thereon while the medium was moving at a first velocity, said predetermined velocity corresponding to a velocity of the medium ranging from approximately 1/6 to approximately ⅓ of said first velocity.

8. In an information recording and reproducing system having transducing means for recording and reproducing signal information on and from a plurality of generally parallel tracks located adjacent one another on a recording medium, said medium having an area of physical proximity to a rotating means carrying the transducing means, transport means for precisely controlling the movement of the medium relative to said rotating means to effect movement of the recording medium at a desired velocity so that the area of proximity is controlled, allowing desired tracks to be scanned by the transducing means during reproducing;

monitoring means for providing signals in accordance with increments of distance that the medium moves;

drive means responsive to the signals from the monitoring means for providing variable width pulses that drive the transport means, each of said pulses being terminated when the medium has moved a predetermined distance corresponding to a preselected number of said increments of distances ; and, control means, adapted for manipulation, for controlling said drive means to selectively enable said drive means to provide pulses at a rate substantially determined by said manipulation to drive the transport means at a continuously variable desired velocity.

9. The system of claim 8 wherein the drive means is operatively connected to the monitoring means, said drive means including means for counting the signals from the monitoring means and driving the transport means until a predetermined number of signals corresponding to said predetermined distance has been counted.

10. The system of claim 9 wherein the counting means comprises a counter which is preset to stop the drive means from driving the transport means when said predetermined number of signals has been counted.

11. The system of claim 9 wherein the drive means further includes means for disabling the counting means from further counting after said predetermined number of signals has been counted until the counting means is reset to begin counting again, said means for disabling being operatively coupled between the input and the output of said counting means.

12. The system of claim 11 wherein the disabling means comprises a gate operatively connected to the input of the counting means, and having a first input coupled to the output of said counting means, and a second input coupled to said monitoring means such that said disabling means passes signals from said monitoring means to said counting means until the output of said counting means changes state in response to counting the predetermined number of signals from said monitoring means.

13. The system of claim 8 wherein the control means includes a timing means for enabling the drive means after a predetermined timed interval determined by said manipulation, said timing means having an output terminal coupled to a clear input terminal of said counting means so as to clear said counting means after said predetermined timed interval.

14. The system of claim 13 wherein the drive means further includes means for triggering the timing means to begin timing the timed interval after the medium has moved said pedetermined distance.

15. The system of claim 13 wherein the timing means comprises a capacitor and a controlled current source adapted for manipulation for supplying current to the capacitor at a controlled rate.

16. The system of claim 15 wherein the timing means further comprises a multivibrator means responsive to the voltage across said capacitor, said multivibrator means providing a signal to enable the drive means when the voltage across the capacitor reaches a predetermined level.

17. The apparatus of claim 16 wherein the multivibrator includes means for discharging said capacitor after the voltage reaches said predetermined level and the drive means further includes means for triggering the multivibrator after the medium has moved the predetermined distance allowing the capacitor to begin charging again.

18. Apparatus for controlling the movement of an elongated medium for use in an information reproducing system of the type which has transducing means for reproducing information recorded on a plurality of generally parallel tracks located adjacent to one another on a recording medium, said medium having an area of physical proximity to a rotating means carrying the transducing means, transport means for precisely controlling the movement of the medium relative to the rotating means to effect movement of the recording medium at a continuously variable desired velocity so that the area of physical proximity is controlled, allowing desired tracks to be scanned by the transducing means during reproducing;
- monitoring means for monitoring the movement of the medium and providing a signal in response to movement of said medium by a constant incremental distance;
- drive means responsive to the signals from the monitoring means for providing variable width pulses, each of which is controlled to have a width for driving the transport means until the medium has moved a predetermined distance corresponding to a predetermined number of incremental distances, said drive means also providing an indicating signal when the medium has moved said predetermined distance; and,
- control means, adapted for manipulation and responsive to the indicating signal from the drive means, for enabling the drive means to provide pulses to drive the transport means to move said medium additional predetermined distances each corresponding to said predetermined number of incremental distances, the rate of drive pulses being determined by said manipulation to move said recording medium at said variable desired velocity.

19. In an information recording and reproducing system having transducing means for recording and reproducing signal information on and from a plurality of generally parallel tracks located adjacent one another on a recording medium, said medium having an area of physical proximity to a rotating means carrying the transducing means, said system further having transport means for precisely controlling the movement of the medium relative to said rotating means so that the area of proximity is controlled allowing the desired track to be scanned by the transducing means during reproducing;
- pulse drive control means, adapted for manipulation, for providing pulse drive signals at a rate substantially determined by said manipulation to drive the transport means such that the medium is moved at an effective velocity ranging from zero to a relatively low velocity and the pulse drive signal being of a variable duration depending on the effective velocity sufficient to move the medium a predetermined distance;
- velocity servo control means adapted for manipulation for providing an adjustable continuous drive signal to drive the transport means such that the medium is moved at a velocity ranging from a cross-over velocity corresponding to said relatively low velocity of the medium to a relatively high velocity; and,
- switching means for switching control of the transport means from said pulse drive control means to said velocity servo control means when the transported medium velocity reaches and exceeds said cross-over velocity.

20. The system of claim 19 wherein signal information was recorded on the medium while the medium moved at a first velocity, said cross-over velocity of the transport means corresponding to an effective velocity of the medium ranging from approximately 1/6 to ⅓ of said first velocity.

21. In an information recording and reproducing system having transducing means for recording and reproducing signal information on and from a plurality of generally parallel tracks located adjacent one another on a recording medium, said medium having an area of physical proximity to a rotating means carrying the transducing means, said system further having transport means for precisely controlling the movement of the medium relative to said rotating means so that the area of proximity is controlled, thereby allowing desired tracks to be scanned by the transducing means during reproducing;
- pulse drive control means for controlling the effective velocity of the medium ranging from zero to a relatively low velocity comprising;
- monitoring means for monitoring the movement of the medium and providing signals in accordance with the distance that the medium moves;
- pulse drive means, responsive to the signals from the monitoring means, for driving the transport means until the medium has moved a predetermined distance, and
- control means adapted for manipulation for controlling said pulse drive means, said control means being adapted to selectively enable said pulse drive means to drive the transport means such that the effective velocity of the medium is substantially determined by said manipulation;
- velocity servo control means adapted for manipulation for providing an adjustable continuous signal to drive the transport means such that the medium is moved at a velocity ranging from a cross-over velocity corresponding to said relatively low velocity of the medium to a relatively high velocity; and switching means for switching control of the transport means from said pulse drive control means to said velocity servo control means when the transported medium velocity reaches and exceeds said cross-over velocity.

22. The system of claim 21 wherein the signal information was recorded on the medium while the medium moved at a first velocity, said cross-over velocity of the transport means corresponding to an effective velocity of the medium ranging from approximately 1/6 to 166 of said first velocity.

* * * * *

REEXAMINATION CERTIFICATE (3823rd)

United States Patent [19]
Mauch

[11] B1 4,224,645
[45] Certificate Issued Aug. 3, 1999

[54] METHOD AND APPARATUS FOR CONTROLLING THE MOVEMENT OF A RECORDING MEDIUM

[75] Inventor: Paul A. Mauch, Mountain View, Calif.

[73] Assignee: Ampex Corporation, Redwood City, Calif.

Reexamination Request:
No. 90/004,450, Nov. 12, 1996

Reexamination Certificate for:
Patent No.: 4,224,645
Issued: Sep. 23, 1980
Appl. No.: 05/874,739
Filed: Feb. 3, 1978

[51] Int. Cl.$^6$ .................................................. G11B 15/46
[52] U.S. Cl. ..................... 360/73.08; 360/70; 360/73.09
[58] Field of Search ............................ 360/73.08, 73.09, 360/74.1, 71, 70; 318/685, 696, 811; 388/804, 805, 811, 812, 819, 820; 242/334, 334.1, 334.2, 334.3, 334.4; 386/80, 81

[56] References Cited

U.S. PATENT DOCUMENTS

| | | | |
|---|---|---|---|
| 3,185,364 | 5/1965 | Kleist | 226/24 |
| 3,196,421 | 7/1965 | Grace | 340/174.1 |
| 3,413,626 | 11/1968 | Smith | 340/174.1 |
| 3,505,614 | 4/1970 | Marthe | 332/9 |
| 3,614,757 | 10/1971 | Burr | 340/174.1 |
| 3,665,500 | 5/1972 | Lewis | 318/596 |
| 3,921,132 | 11/1975 | Baldwin | 340/146.1 |
| 3,935,521 | 1/1976 | Burr | 388/847 |
| 3,952,238 | 4/1976 | Cutter | 318/571 |
| 4,190,869 | 2/1980 | Ota | 386/80 |
| 4,241,365 | 12/1980 | Koda et al. | 360/73.05 |
| 4,276,571 | 6/1981 | Sakamoto | 386/80 |

FOREIGN PATENT DOCUMENTS

| | | |
|---|---|---|
| 1395889 | 7/1965 | France . |
| 1504452 | 12/1967 | France . |
| 2278131 | 2/1976 | France . |
| 2330107 | 5/1977 | France . |
| 2059426 | 6/1971 | Germany . |
| 1815889 | 3/1972 | Germany . |
| 1574980 | 4/1972 | Germany . |
| 1438842 | 6/1972 | Germany . |
| 2530731 | 1/1976 | Germany . |

(List continued on next page.)

OTHER PUBLICATIONS

Opelt, "Schaltungstechnik des Servosystems und der Funktionssteuerung", Grundig Technische Informationen, pp. 870–890 (Feb. 1971).

Defendants' Reply Brief in Support of their Motion for Summary Judgment of Noninfringement of US Patent No. 4,224,645: pp. 14–15; Ampex et al v. Mitsubishi et al, CA 95–582 (RRM), DC Del.

Revised Joint Pre–Trial Order: p. 1 (Ex. 21); pp. 1, 10–14 (Ex. 23); Ampex et al v. Mitsubishi et al, CA 95–582 (RRM), DC Del.

Mitsubishi's Supplement to Joint Pre–Trial Order: pp. 1–8, 17–18 (Ex. 3); pp. 1, 6–9 (Ex. 5) and attachments; Ampex et al v. Mitsubishi et al, CA 95–582 (RRM), DC Del.

Opelt, "Schaltungstechnik des Servosystems und der Funktionssteuerung," Grundig Technische Informationen, pp. 870–876, 884–885 (Feb. 1971).

(List continued on next page.)

*Primary Examiner*—A. Psitos

[57] ABSTRACT

A recording medium transport control precisely controls the movement of a recording medium such as magnetic tape at a desired velocity. A pulse drive control adapted for manipulation provides drive pulses to the transport. Each drive pulse is of a variable duration sufficient to drive the transport so that the medium is moved a predetermined distance. One embodiment of the present invention includes a velocity servo drive control, also adapted for manipulation, for providing an adjustable continuous drive signal to the transport and a switch for switching control of the transport from the pulse drive control to the velocity servo drive control when the velocity of the transport reaches a predetermined cross-over velocity.

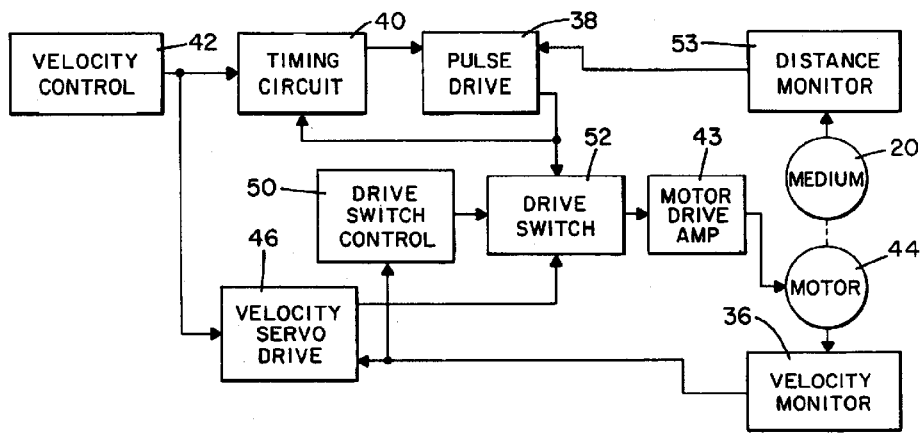

FOREIGN PATENT DOCUMENTS

| | | |
|---|---|---|
| 1438842 | 10/1976 | Germany . |
| 2645107 | 5/1977 | Germany . |
| 2823470 | 12/1978 | Germany . |
| 48-28573 | 9/1973 | Japan . |
| 51-77310 | 7/1976 | Japan . |
| 52-48804 | 12/1977 | Japan . |
| 6402942 | 9/1964 | Netherlands . |
| 6702662 | 9/1967 | Netherlands . |
| 1238390 | 7/1971 | United Kingdom . |
| 1474419 | 5/1977 | United Kingdom . |
| 1492576 | 11/1977 | United Kingdom . |

OTHER PUBLICATIONS

Kornhaas, "Standbildautomatik im Grundig BK 204 bzw. BK 401," Grundig Technische Informationen, pp. 106–109 (Jan. 1973).

Opelt, "Servo– und Funktionssteuerungen in den professionellen Videorecordern nach dem GPR–System," Grundig Technische Informationen, pp. 844–850 (May–Jun. 1976).

Kornhaas, "Videorecorder BK 401 Beschreibung der Einzelbildspeicherung," Grundig Technische Informationen, pp. 146–150 (Feb. 1973).

Lazarev, V.I., "Magnetic Recording of Television Images," State Energy Publishing House, pp. 72–73 (1973).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–21 is confirmed.

Claim 22 is determined to be patentable as amended.

22. The system of claim 21 wherein the signal information was recorded on the medium while the medium moved at a first velocity, said cross-over velocity of the transport means corresponding to an effective velocity of the medium ranging from approximately 1/6 to [166] *1/3* of said first velocity.

* * * * *